(12) United States Patent
Menair

(10) Patent No.: US 11,655,020 B2
(45) Date of Patent: May 23, 2023

(54) NON ROTATIONALLY CONSTRAINED FRICTION DAMPER FOR DRIVE SHAFT

(71) Applicant: LOCKHEED MARTIN CORPORATION, Bethesda, MD (US)

(72) Inventor: Emmett Emile Menair, Fort Worth, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 1141 days.

(21) Appl. No.: 16/271,298

(22) Filed: Feb. 8, 2019

(65) Prior Publication Data
US 2020/0255131 A1  Aug. 13, 2020

(51) Int. Cl.
| | | |
|---|---|---|
| *B64C 27/00* | (2006.01) | |
| *F16F 15/12* | (2006.01) | |
| *B64C 27/10* | (2023.01) | |
| *B64C 39/02* | (2023.01) | |
| *F16F 15/00* | (2006.01) | |

(52) U.S. Cl.
CPC ........ *B64C 27/001* (2013.01); *F16F 15/1201* (2013.01); *B64C 27/10* (2013.01); *B64C 39/024* (2013.01); *B64C 2201/024* (2013.01); *B64C 2201/108* (2013.01); *B64C 2201/141* (2013.01); *F16F 15/00* (2013.01)

(58) Field of Classification Search
CPC ............. B64C 27/001; B64C 2201/141; F16F 15/1201; F16F 15/00
See application file for complete search history.

(56) References Cited

U.S. PATENT DOCUMENTS

| | | | |
|---|---|---|---|
| 9,677,607 B2 | 6/2017 | Nevers et al. | |
| 10,151,379 B2* | 12/2018 | Manzoor | F16H 55/36 |
| 2009/0067767 A1* | 3/2009 | Faass | F16C 27/00 |
| | | | 384/440 |
| 2017/0305544 A1 | 10/2017 | Eadie et al. | |

FOREIGN PATENT DOCUMENTS

| | | | | |
|---|---|---|---|---|
| FR | 3006022 A1 * | 11/2014 | ........... | B64C 27/001 |
| JP | H06159444 A * | 6/1994 | | |
| JP | 2000035086 A * | 2/2000 | | |
| WO | WO-2016177432 A1 * | 11/2016 | ........... | B62D 5/0409 |

* cited by examiner

*Primary Examiner* — Melanie Torres Williams
(74) *Attorney, Agent, or Firm* — Michael Best & Friedrich LLP

(57) ABSTRACT

An aircraft, damper assembly for an aircraft and method for reducing a vibration in a rotating shaft. The damper assembly includes a damper element, a first plate and a second plate. The damper element has a damper opening shaped to surround the shaft. The first plate has a first opening shaped to surround the shaft and a recess receptive to the damper element, the damper element being rotatable within the recess. The second plate has a second opening shaped to surround the shaft and secured to the first plate to close the recess and secure the damper element between the first plate and second plate. The damper element rotates within the closed recess.

20 Claims, 7 Drawing Sheets

NON ROTATIONALLY CONSTRAINED FRICTION DAMPER FOR DRIVE SHAFT

BACKGROUND

The subject matter disclosed herein generally relates to reducing vibrations at natural frequencies of a drive shaft in a rotary aircraft and, in particular, to a design for a damper for reducing vibrations for a drive shaft.

Many rotary aircraft designs include a single main rotor and a tail rotor. A tail propeller drive shaft is used to transfer rotary power from a motor of the rotary aircraft to the tail rotor. A supercritical drive shaft is a shaft that passes through at least one of its natural frequencies, or bending modes, while accelerating from zero to its normal operating speed. In common applications of supercritical drive shafts, friction dampers are placed at anti-nodes of natural frequencies in order to reduce vibration by controlling shaft deflection as the shaft transitions through a natural frequency. In current use, the friction dampers are placed at the anti-nodes of the second natural frequency. Placed at these anti-nodes, the friction dampers also control shaft deflection at the first natural frequency. In current use, dampers nutate or rotate in the direction of shaft rotation during periods of shaft contact until that motion is impeded by the mounting studs that pass through them. Once the rotation of the damper is impeded, the damping effectiveness of the damper is reduced.

BRIEF DESCRIPTION

According to an embodiment, a damper assembly for reducing vibration in a rotating shaft includes a damper element, a first plate and a second plate. The damper element has a damper opening shaped to surround the shaft. The first plate has a first opening shaped to surround the shaft and a recess receptive to the damper element, the damper element being rotatable within the recess. The second plate has a second opening shaped to surround the shaft and secured to the first plate to close the recess and secure the damper element between the first plate and second plate.

In addition to one or more of the features described above, or as an alternative, in further embodiments the damper element is a ring rotatable without rotational constraint within the recess of the first plate In addition to one or more of the features described above, or as an alternative, in further embodiments the first plate includes a lip at an outer circumferential edge.

In addition to one or more of the features described above, or as an alternative, in further embodiments the lip defines at least one relief.

In addition to one or more of the features described above, or as an alternative, in further embodiments the lip restrains radial motion of the damper element.

In addition to one or more of the features described above, or as an alternative, in further embodiments when the shaft passes through the damper opening, the first opening and the second opening, a rotation of the shaft induces a rotation of the damper element within the recess.

In addition to one or more of the features described above, or as an alternative, in further embodiments wherein the first opening of the first plate has a first inner diameter, the second opening of the second plate has a second inner diameter, the damper opening of the damper element has a damper inner diameter, and the damper inner diameter of the damper element is less than the first and second inner diameters of the first plate and second plate.

According to another embodiment, a method for reducing a vibration in a rotating shaft includes: placing a damper element around the shaft; disposing the damper element within a recess of a first plate; and securing a second plate to the first plate to close the recess, wherein the damper element rotates within the closed recess.

In addition to one or more of the features described above, or as an alternative, in further embodiments the damper element is placed around the shaft at an anti-node of a vibrational mode of the shaft.

In addition to one or more of the features described above, or as an alternative, in further embodiments wherein the damper element is a ring, the method further includes rotating the damper element without rotationally constraint within the recess.

In addition to one or more of the features described above, or as an alternative, in further embodiments the first plate includes a lip at an outer circumferential edge.

In addition to one or more of the features described above, or as an alternative, in further embodiments the lip defines at least one relief.

In addition to one or more of the features described above, or as an alternative, in further embodiments radial motion of the damper element is constrained via the lip.

In addition to one or more of the features described above, or as an alternative, in further embodiments the damper element rotates via interaction with the rotating shaft.

In addition to one or more of the features described above, or as an alternative, in further embodiments wherein the first plate has an inner diameter and the second plate has an inner diameter and wherein the inner diameter of the damper element is less than inner diameter of the first plate and second plate.

According to yet another embodiment, an aircraft includes a shaft and a damper assembly including: a damper element having a damper opening shaped to surround the shaft; a first plate having a first opening shaped to surround the shaft and a recess receptive to the damper element, the damper element being rotatable within the recess; and a second plate having a second opening shaped to surround the shaft and secured to the first plate to close the recess and secure the damper element between the first plate and second plate The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

Figure 1A:
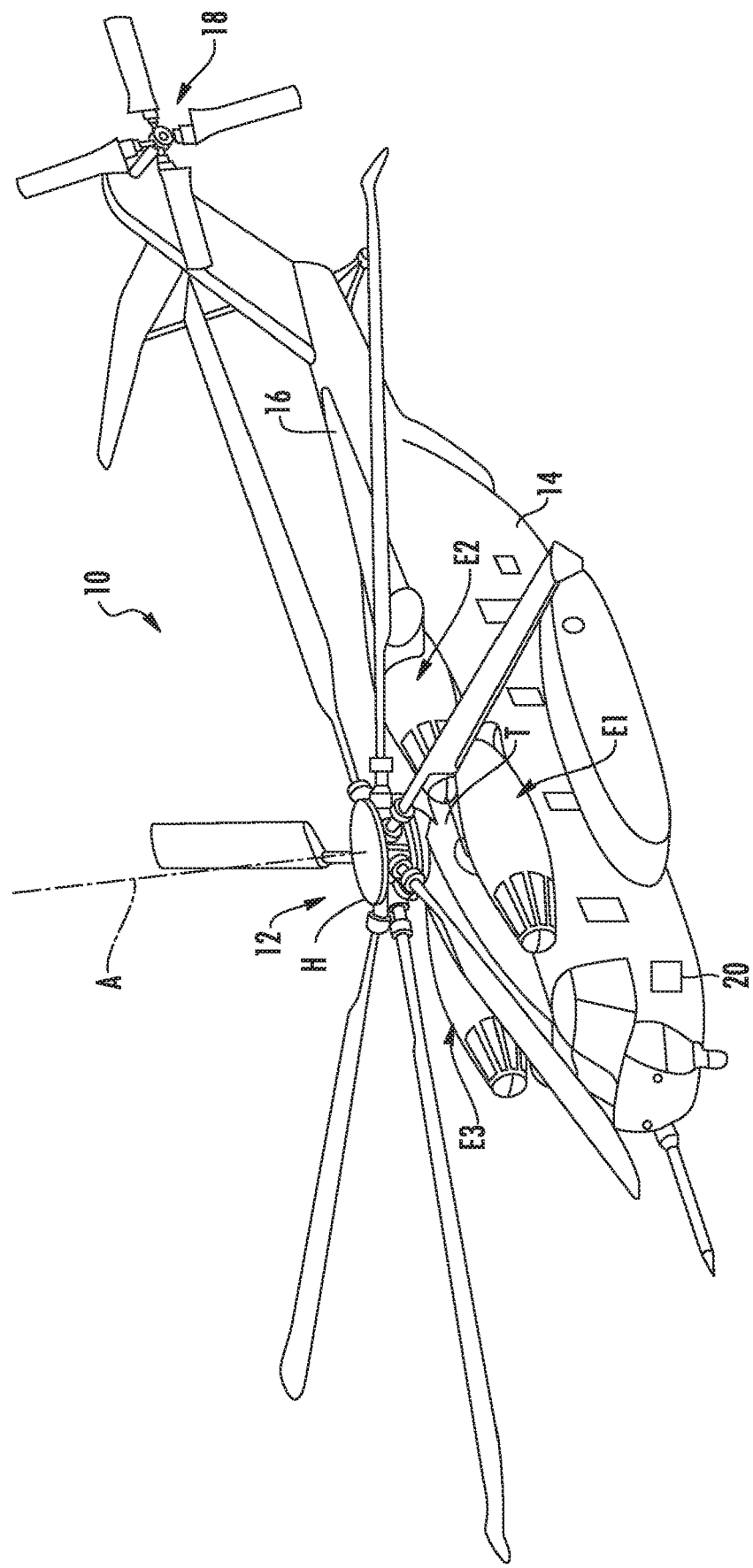
FIG. 1A schematically illustrates a rotary-wing aircraft having a main rotor system.

FIG. 1A schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E1-E3 to a power transmission gearbox G, to drive the main rotor system 12 about a respective axis of rotation A and to rotate a shaft (202, FIG. 2) for transferring power to the tail rotor system 18. The aircraft 10 includes a landing gear (not shown) and a control system 20 that controls operation of the aircraft in order to provide autonomous operation of the aircraft, including flight plane creation, engine control, steering and navigation, etc.

Figure 1B:
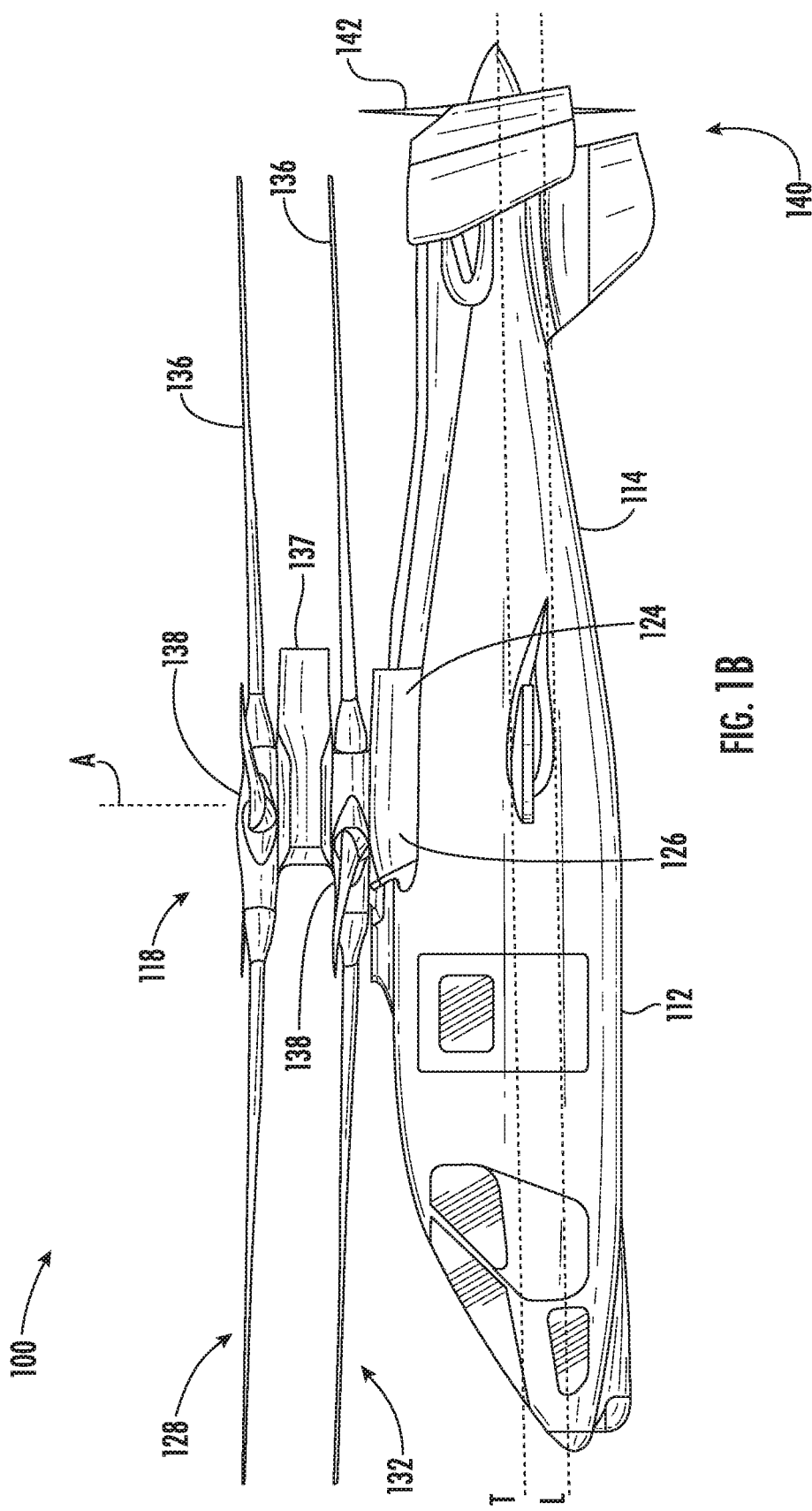
FIG. 1B schematically illustrates a rotary-wing aircraft having a coaxial contra-rotating main rotor system.

FIG. 1B depicts an exemplary embodiment of a rotary wing, vertical takeoff and land (VTOL) aircraft 100. The aircraft 100 includes an airframe 112 with an extending tail 114. A dual, counter rotating, coaxial main rotor assembly 118 is located at the airframe 112 and rotates about a main rotor axis, A. In an exemplary embodiment, the airframe 112 includes two seats for flight crew (e.g., pilot and co-pilot) and six seats for passengers. However an airframe 112 having another configuration is within the scope of the present disclosure. The main rotor assembly 118 is driven by a power source, for example, one or more engines 124 via a gearbox 126. The main rotor assembly 118 includes an upper rotor assembly 128 driven in a first direction (e.g., counter-clockwise) about the main rotor axis, A, and a lower rotor assembly 132 driven in a second direction (e.g., clockwise) about the main rotor axis, A, opposite to the first direction (i.e., counter rotating rotors). Each of the upper rotor assembly 128 and the lower rotor assembly 132 includes a plurality of rotor blades 136 secured to a rotor hub 138. In some embodiments, the aircraft 100 further includes a translational thrust system 140 located at the extending tail 114 to provide translational thrust (forward or rearward) for aircraft 100.

Any number of blades 136 may be used with the rotor assembly 118. The rotor assembly 118 includes a rotor hub fairing 137 generally located between and around the upper and lower rotor assemblies such that the rotor hubs 138 are at least partially contained therein. The rotor hub fairing 137 provides drag reduction. Rotor blades 136 are connected to the upper and lower rotor hubs 138 in a hingeless manner, also referred to as a rigid rotor system. Although a particular aircraft configuration is illustrated in this non-limiting embodiment, other rotary-wing aircraft will also benefit from embodiments of the invention. Although, the dual rotor system is depicted as coaxial, embodiments include dual rotor aircraft having non-coaxial rotors.

The translational thrust system 140 includes a propeller 142 connected to and driven by the engine 124 via the gearbox 126. The translational thrust system 140 may be mounted to the rear of the airframe 112 with a translational thrust axis, T, oriented substantially horizontal and parallel to the aircraft longitudinal axis, L, to provide thrust for high-speed flight. The translational thrust axis, T, corresponds to the axis of rotation of propeller 142. While shown in the context of a pusher-prop configuration, it is understood that the propeller 142 could also be more conventional puller prop or could be variably facing so as to provide yaw control in addition to or instead of translational thrust. It should be understood that any such system or other translational thrust systems may alternatively or additionally be utilized. Alternative translational thrust systems may include different propulsion forms, such as a jet engine.

Figure 2:
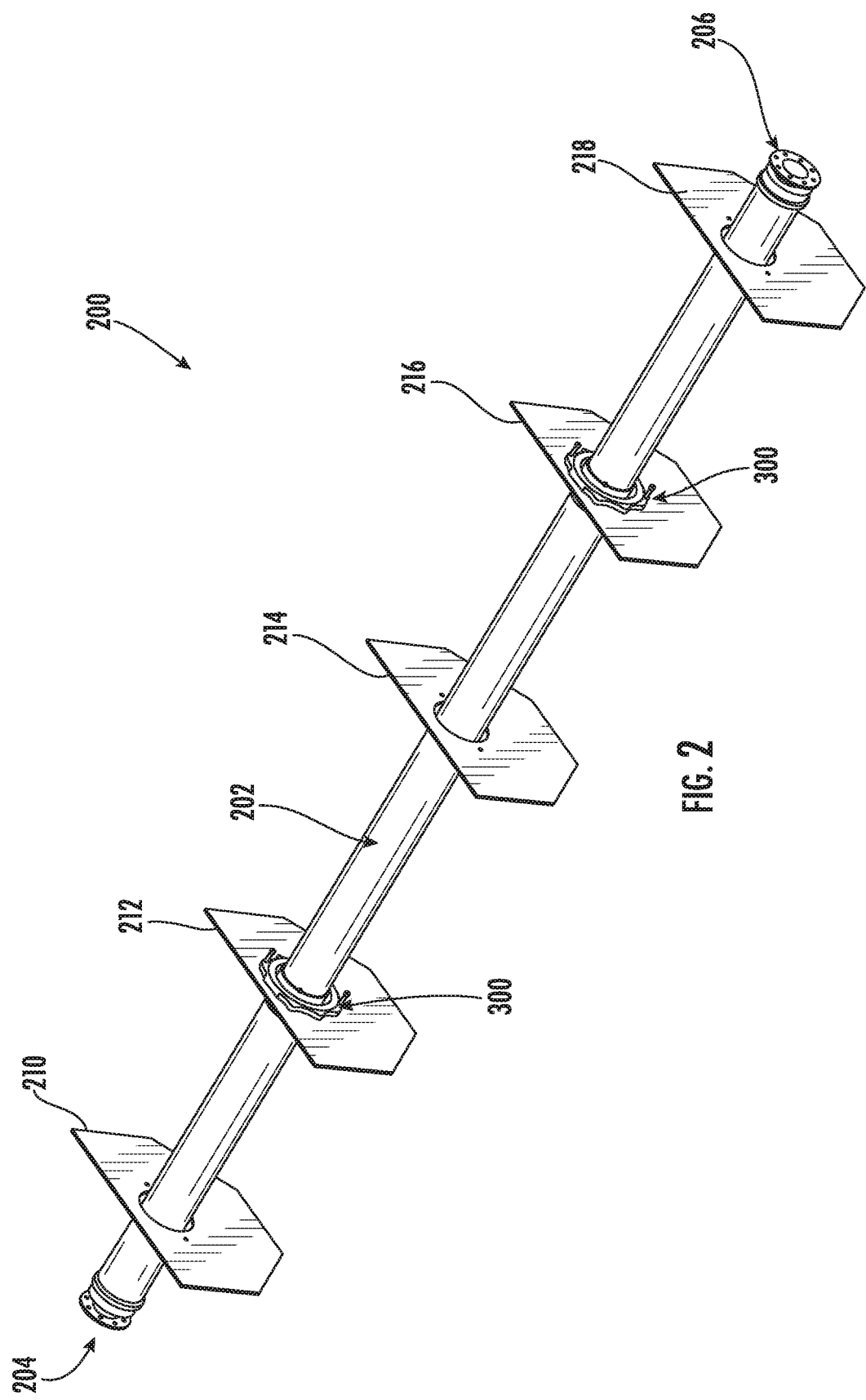
FIG. 2 shows a perspective view of a tail section of the rotary aircraft of FIG. 1A or 1B.

FIG. 2 shows a perspective view of a tail section 200 of the rotary aircraft 10 of FIG. 1A. The tail section 200 includes a rotor shaft 202 extending from a forward end 204 to an aft end 206. The shaft 202 couples to one or more engines E1 through E3 at the forward end 204 and couples to the tail rotor system 18, FIG. 1A at the aft end 206. While shown connected to one or more engines E1 through E3, it is understood the shaft 202 could also be connected to some other rotational motion device in other aspects. Moreover, while shown in the context of a tail rotor system 18 of FIG. 1A, the aft end 206 of the shaft 200 could also connect to a translational thrust system 140 as shown in FIG. 1B.

The shaft 200 passes through various support structures 210, 212, 214, 216 and 218. The support structures 210, 212, 214, 216 and 218 can provide structural support for the airframe 14 along the tail of the aircraft 10. The at least some of the support structures (e.g., support structures 212 and 216) includes a damper assembly 300, FIG. 3 for reducing vibrations or bending of the shaft 202 during acceleration of the shaft 202 from zero to its normal operational speed. While shown with five (5) support structures 210, 212, 214, 216 and 218, it is understood that other numbers of support structures can be used in other aspects of the invention.

Figure 3:
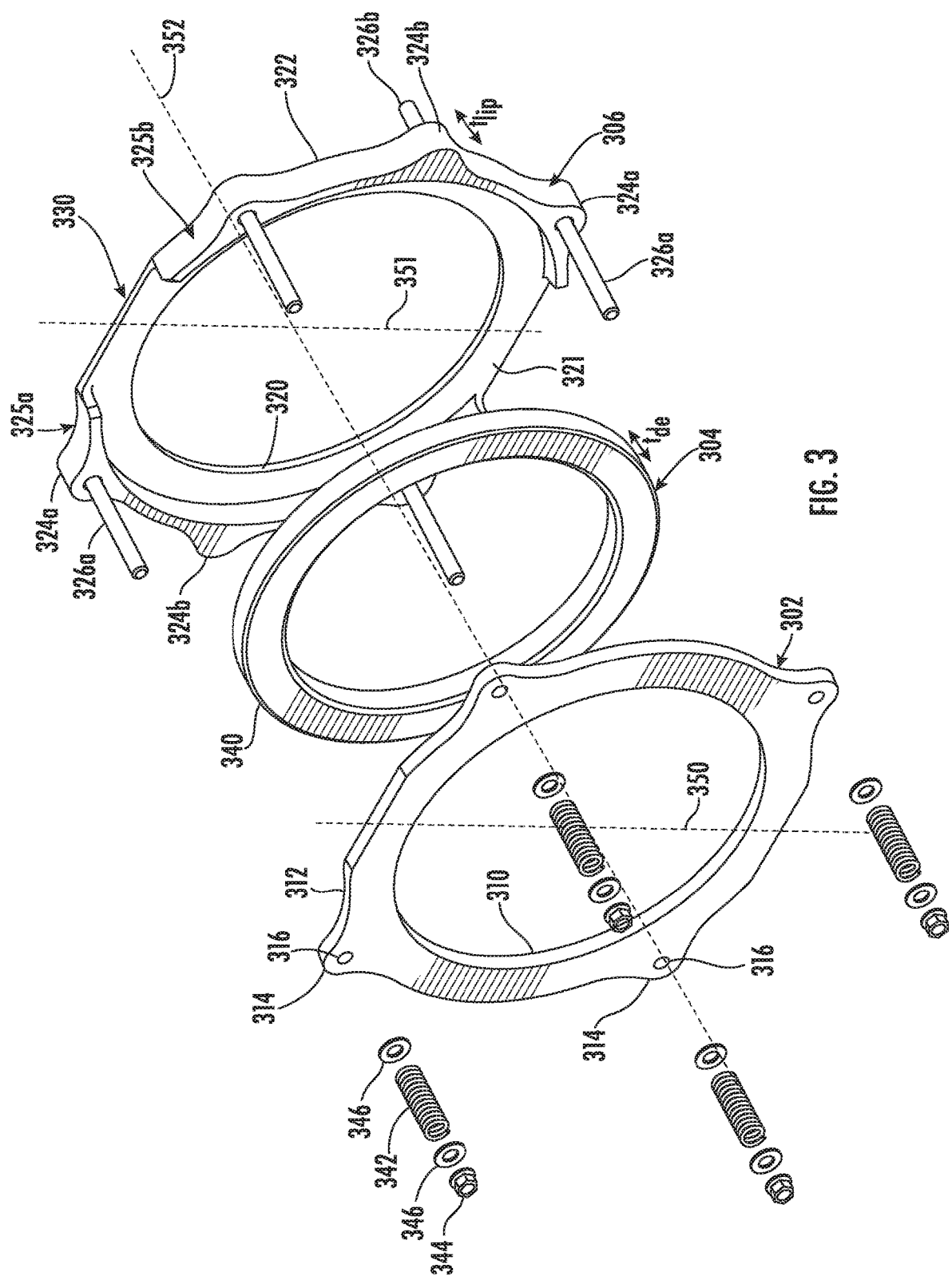
FIG. 3 shows an exploded view of a damper assembly in an embodiment of the present invention.

FIG. 3 shows an exploded view of a damper assembly 300 in an embodiment of the present invention. The damper assembly 300 includes a first plate or front plate 302, a second plate or back plate 306 and a damper element 304 that is disposed between the front plate 302 and the back plate 306 when the damper assembly 300 is assembled.

The front plate 302 is a ring-like structure having a selected thickness, a radially inner surface 310 defining a front plate inner diameter and a radially outer surface 312. A medial line 350 divides the front plate 302 between left and right halves as shown in the exploded view. The front plate 302 also includes a longitudinal axis 352 that is perpendicular to the plane of the front plate 302. The radially inner surface 310 forms a circular surface defining a passage through which the shaft 202, FIG. 2 passes. The plane of the front plate 302 is perpendicular to the axis of rotation of the shaft 202 shown in FIG. 2. The radially outer surface 312 includes a plurality of flanged regions 314. Each flanged region 314 includes a hole 316 having an axis parallel to a longitudinal axis 352 of the front plate 302, which is substantially parallel to the axis of rotation of the shaft 202. In the illustrative embodiment of FIG. 2, there are four flanged regions 314, each having a hole 316 there through. The flanged regions 314 are symmetrically disposed about the medial line 350 of the front plate 302.

The back plate 306 includes a flat disk 321 having a selected thickness and having a radially inner surface 320 defining a back plate inner diameter and a radially outer surface 322. Similar to the front plate 302, the back plate 306 is also defined by medial line 351 and the longitudinal axis 352. In FIG. 3, the front plate 302, back plate 306 and damper element 304 share the same longitudinal axis 352. The radially inner surface 320 forms a circular surface defining a passage through which the shaft 202, FIG. 2 passes. The radially outer surface 322 includes a lip system. In the illustrative embodiment, the lip system includes two lips 325*a*, 325*b* separated by reliefs 330 which are symmetrically positioned around the medial line 351 of the back plate 206. The lip system extends away from the disk 321 along the longitudinal axis 352 over a lip length $t_{lip}$. The lip defines a recess or cavity into which the damper element 304 can be disposed. The lip system includes a plurality of flanged regions 324a and 324b. Each flanged region 324a includes a stud 326a extending from the flanged region 324a in a direction for receiving the front plate 302 and parallel to the longitudinal axis of the back plate 306. In the illustrative embodiments of FIG. 3, there are four flanged regions 324a to coincide with the four flanged regions 314 of the front plate 302, and two flanged regions 324b for securing the back plate 306 to a support structure. Each flanged regions 324b includes stud 326b that extends from the face that does not receive the damper element 304 in order to secure the back plate 306 to a support structure. In FIG. 3 the flange regions 324b are diametrically opposed to each other across the medial line 351. In various embodiments, additional flanged regions 324a and 324b can be added along the length of the lip 325 to strengthen the coupling between the front plate 302 and back plate 306 or the coupling between the back plate 306 and the support structure. While shown with two lips 325a, 325b, it is understood that other numbers of lips can be used in the lip system, and that they need not be symmetrical in all aspects of the invention.

Damper element 304 comprises a circular ring. The damper element 304 has a radially outer surface 340 and a radially inner surface 342 having a damper inner diameter defining a passage through which the shaft 202, FIG. 2 can pass. The damper inner diameter is less than the front plate inner diameter and back plate inner diameter. The diameter of the radially outer surface 340 is less than the diameter of a circle defined by the lip system of the back damper plate 204, allowing the damper element 304 to fit within the recess or cavity formed by the lip 325. Additionally, the thickness of the damper element 304 is less than the height of the lip 325. Therefore, with the front plate 302 secured to the back plate 306, the damper element 304 is free to rotate within the recess. To assemble the damper assembly 300, the shaft 202 is passed through the front plate 302, damper element 304 and the back plate 306. The damper element 304 is placed into the recess of the back plate 306 and the front damper plate 302 is placed against the back damper plate 306 so that the studs 326a of the back plate 306 passes through the respective holes 316 of the front plate 302. Each stud 326a is spring loaded by securing the front plate 302 to the back plate 306 via an assembly of washers 346, spring 342 and nut 344. The studs 326b can then be used to secure the assembled damper assembly 300 to a suitable supper structure.

Figure 4:
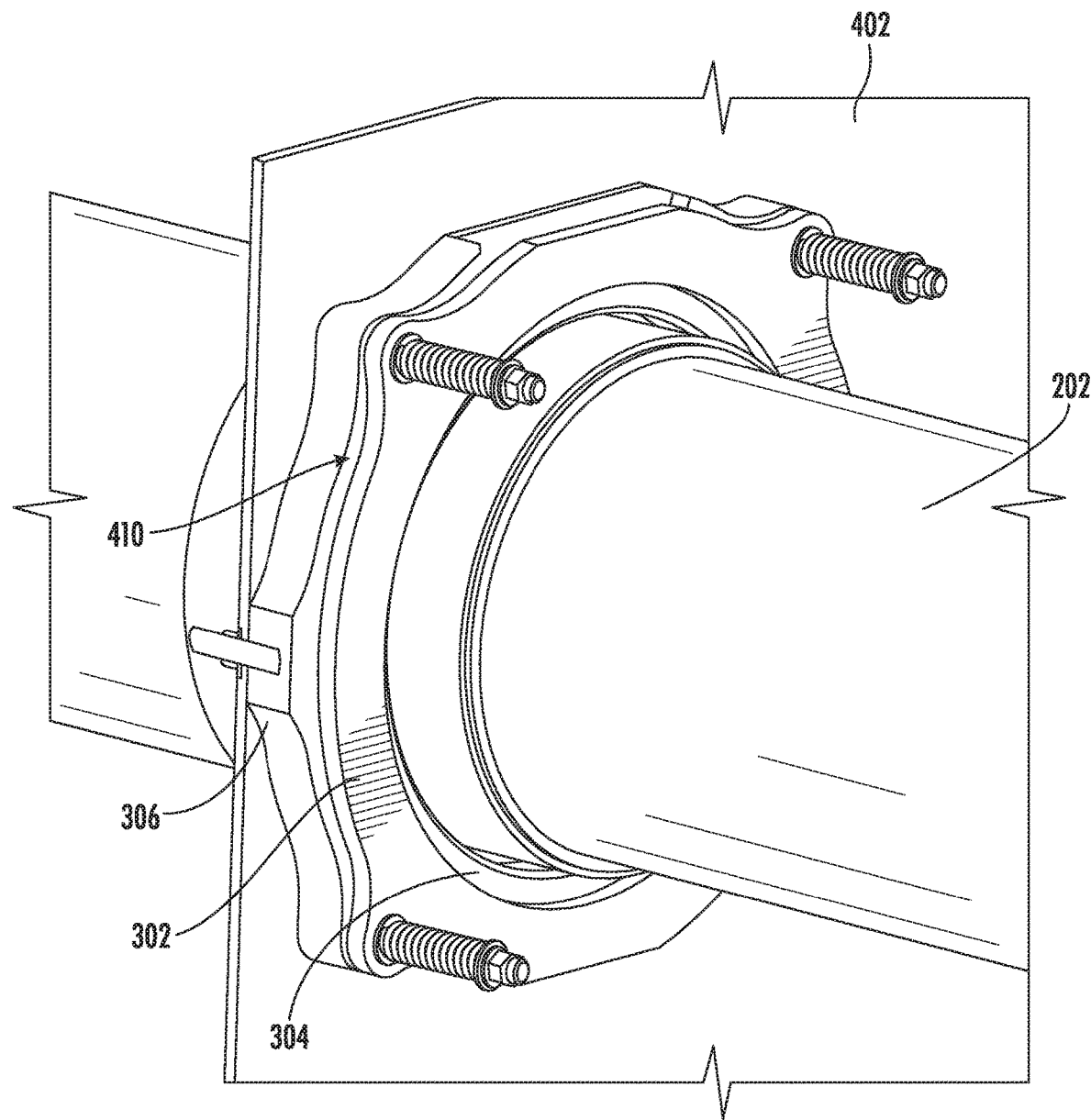
FIG. 4 shows a perspective view of a completed damper assembly.

FIG. 4 shows a perspective view of a completed damper assembly. The back surface of the back plate 306 is placed against a supporting structure 402 and the studs 326b, FIG. 2 secure the back plate 306 to the supporting structure 402. As the shaft 202 rotates, friction or contact between the shaft 202 and the damper element 304 causes the damper element 304 to rotate within the cavity formed by the front plate 320 and back plate 306. The damper element 304 is free to rotate within this cavity, without any rotational constraint. The lip system of the back plate 306 constrains radial motion of the damper element 304.

Figure 5:
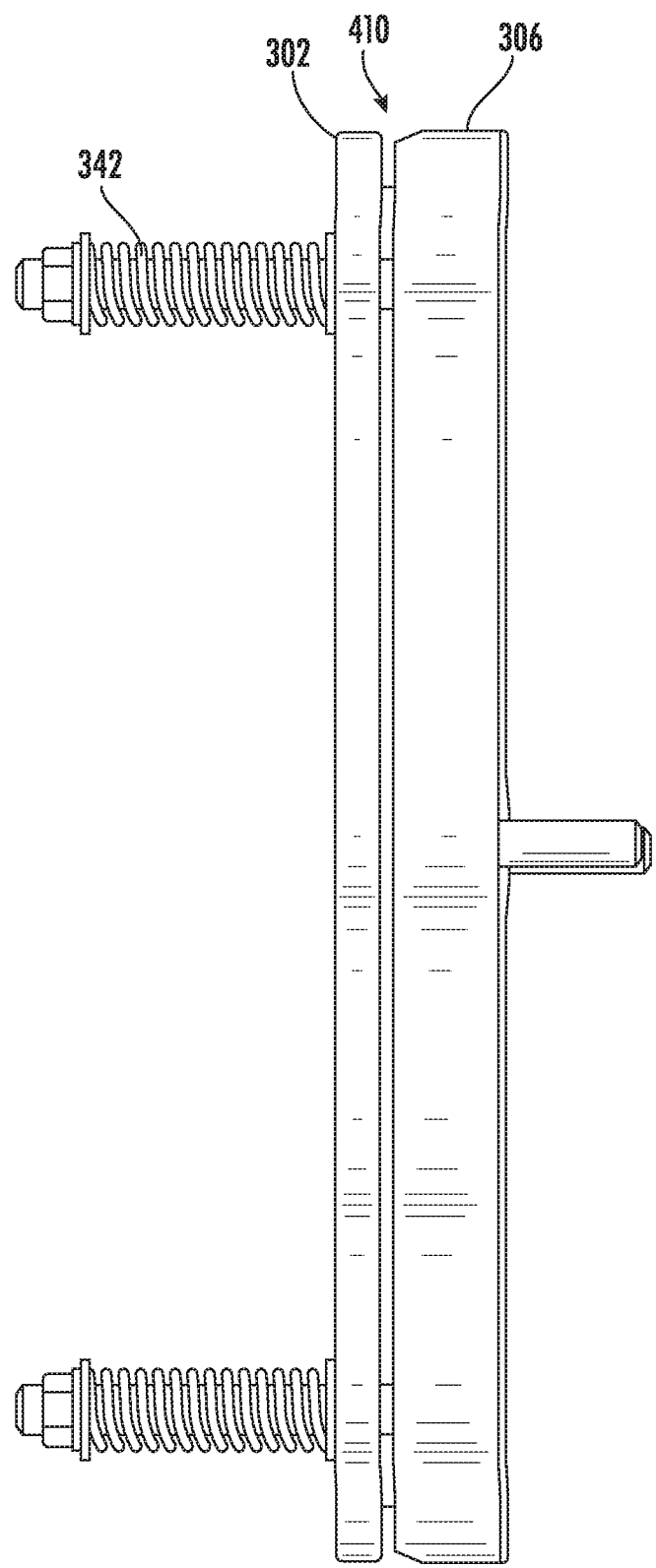
FIG. 5 shows a side view of the damper assembly.

FIG. 5 shows a side view of the damper assembly 300. As shown in FIG. 5, spring 342 provides a clamping force to close a gap 410 between the front plate 302 and the back plate 306 in order to secure the damper element 304 there between. The clamping force can be adjusted on each of the studs 326a through 326b by selectively inserting washers 346 to act as shims between the corresponding spring 342 and nut 344. While shown in the context of the spring 342, it is understood that other biasing elements could be used.

Figure 6:
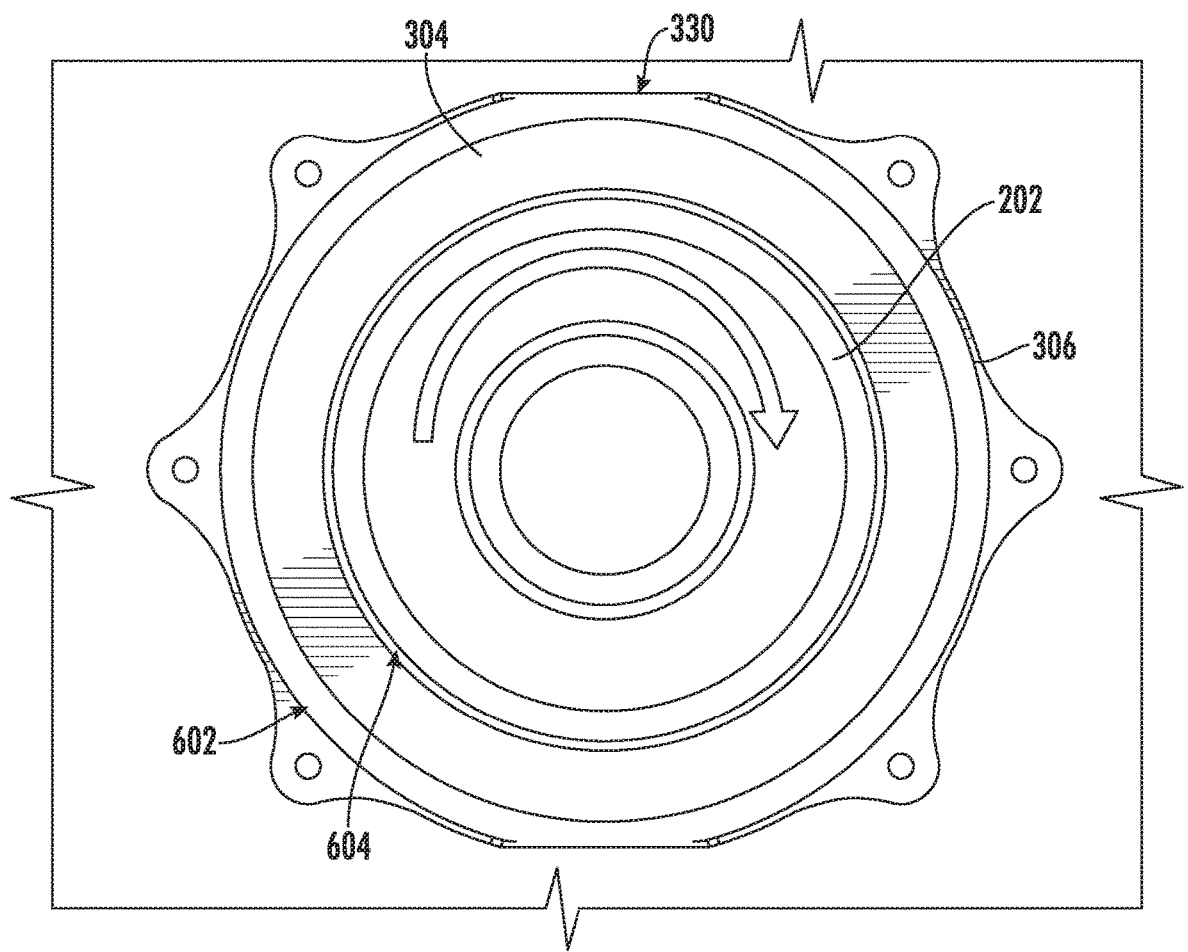
FIG. 6 shows a view along the longitudinal axis of the damper assembly.

FIG. 6 shows a view along the longitudinal axis of the damper assembly. The view shows back plate 306, damper element 304 and shaft 202. The damper element 304 can have infinite rotation within the damper plate, i.e., can rotate without obstruction. In various embodiments, the radial clearance 604 between the damper element 304 and the shaft 202 is less than the radial clearance 602 between the back plate 306 and the damper element 304 in order that the amount of energy the shaft builds when it is excited is radially limited and the rotational travel of the damper due to friction is maximized. In various embodiments, the reliefs 330 can be closed up to provide entire containment of the damper element 304 within the back plate 306.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. By way of example, while shown in the context of a rotary wing aircraft, aspects of the invention can be used in shafts used in fixed wing aircraft, maritime vehicles, land vehicles, industrial machinery and the like. Additionally, while the various embodiment of the invention have been described, it is to be understood that aspects of the invention may include only some of the described embodiments. Accordingly, the invention is not to be seen as limited by the foregoing description.

What is claimed is:

1. A damper assembly for reducing vibration in a rotating shaft, the damper assembly comprising:
    a damper element having a thickness and a damper opening shaped to surround the shaft;
    a first plate having a first opening shaped to surround the shaft and a recess receptive to the damper element, wherein the recess has a height that is greater than the thickness of the damper element; and
    a second plate having a second opening shaped to surround the shaft and secured to the first plate to close the recess and retain the damper element between the first plate and second plate,
    wherein the damper element is rotatable without rotational constraint within the recess of the first plate.

2. The damper assembly of claim 1, wherein the damper element is a ring.

3. The damper assembly of claim 1, wherein the first plate includes a lip at an outer circumferential edge, the lip defining the recess.

4. The damper assembly of claim 3, wherein the lip defines at least one relief.

5. The damper assembly of claim 3, wherein the lip restrains radial motion of the damper element.

6. The apparatus of claim 1, wherein when the shaft passes through the damper opening, the first opening and the second opening, a rotation of the shaft induces a rotation of the damper element within the recess.

7. The apparatus of claim 1, wherein the first opening of the first plate has a first inner diameter, the second opening of the second plate has a second inner diameter, the damper opening of the damper element has a damper inner diameter, and the damper inner diameter of the damper element is less than the first and second inner diameters of the first plate and second plate.

8. The apparatus of claim 1 wherein the second plate does not contact the damper element.

9. A method for reducing a vibration in a rotating shaft the method comprising:
   placing a damper element around the shaft, the damper element having a thickness;
   disposing the damper element within a recess of a first plate, the recess having a height that is greater than the thickness of the damper element; and
   securing a second plate to the first plate to close the recess, wherein the damper element rotates freely within the closed recess.

10. The method of claim 9, further comprising placing the damper element around the shaft at an anti-node of a vibrational mode of the shaft.

11. The method of claim 9, wherein the damper element is a ring, further comprising rotating the damper element without rotational constraint within the recess.

12. The method of claim 9, wherein the first plate includes a lip at an outer circumferential edge, the lip defining the recess.

13. The method of claim 12, wherein the lip defines at least one relief.

14. The method of claim 12, further comprising constraining radial motion of the damper element via the lip.

15. The method of claim 9, further comprising rotating the damper element via interaction with the rotating shaft.

16. The method of claim 9, wherein the first plate has an inner diameter, the second plate has an inner diameter and the damper element has an inner diameter, and further wherein the inner diameter of the damper element is less than each of the inner diameters of the first plate and second plate.

17. An aircraft, comprising:
   a shaft; and
   a damper assembly including:
      a damper element having a thickness and a damper opening shaped to surround the shaft;
      a first plate having a first opening shaped to surround the shaft and a recess having a height that is greater than the thickness of the damper element, the damper element disposed in the recess and being rotatable within the recess; and
      a second plate having a second opening shaped to surround the shaft and secured to the first plate to close the recess and retain the damper element between the first plate and second plate, wherein the damper element rotates without rotational constraint within the recess of the first plate.

18. The aircraft of claim 17, and further comprising a supporting structure wherein the damper assembly is secured to the supporting structure.

19. The aircraft of claim 18, and further comprising a fastening mechanism for securing the second plate to the first plate, the fastening mechanism passing through the first plate, the second plate and the supporting structure.

20. The aircraft of claim 17, wherein the first plate includes a lip at an outer circumferential edge, the lip defining the recess and retraining radial motion of the damper element.

* * * * *